A. B. WIKSTROM.
TRAP.
APPLICATION FILED MAR. 21, 1916.

1,214,626.

Patented Feb. 6, 1917.
2 SHEETS—SHEET 1.

WITNESSES
Edw. S. Hall.
Ross J. Woodward.

INVENTOR
Adolph B. Wikstrom.
BY Richard B. Owen.
ATTORNEY

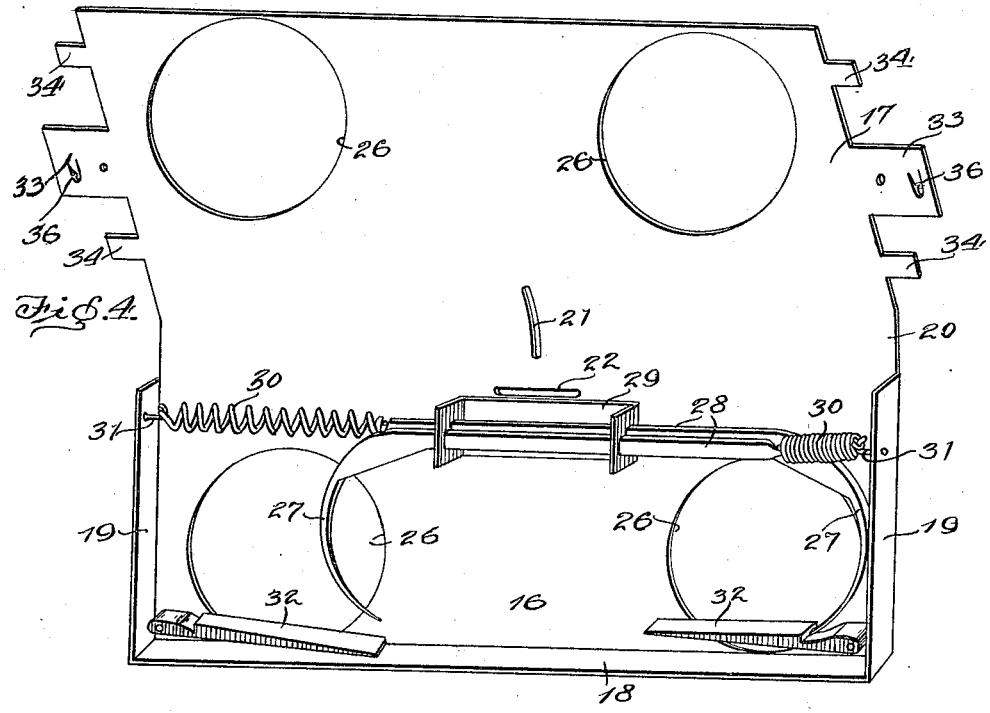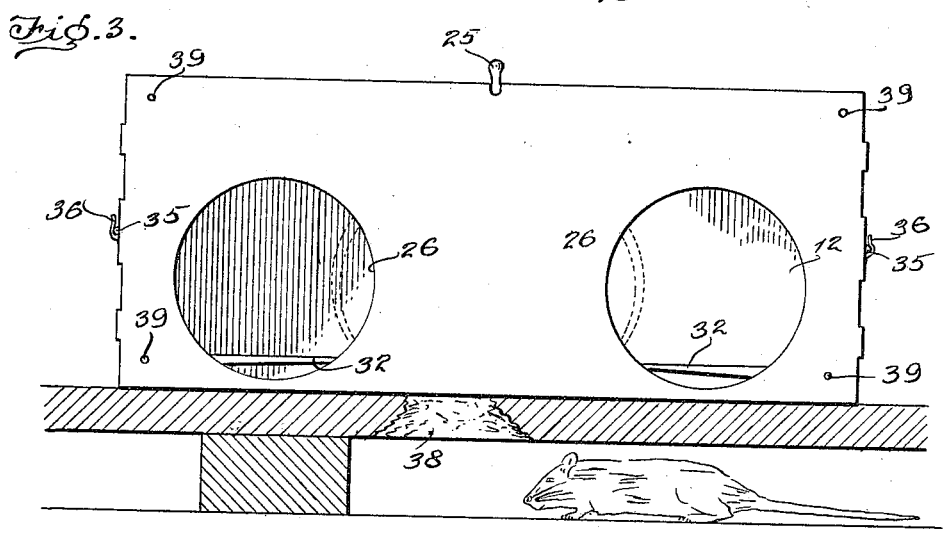

UNITED STATES PATENT OFFICE.

ADOLPH B. WIKSTROM, OF STRANDQUIST, MINNESOTA.

TRAP.

1,214,626.

Specification of Letters Patent.  Patented Feb. 6, 1917.

Application filed March 21, 1916. Serial No. 85,622.

*To all whom it may concern:*

Be it known that I, ADOLPH B. WIKSTROM, a citizen of the United States, residing at Strandquist, in the county of Marshall and State of Minnesota, have invented certain new and useful Improvements in Traps, of which the following is a specification.

This invention relates to an improved trap and the principal object of the invention is to provide a trap having an improved catching mechanism so constructed that an animal passing through the chamber or housing containing the catching means will be caught before passing entirely through the housing.

Another object of the invention is to provide an improved type of housing or receptacle for the catching means, this housing forming part of the body portion of the trap and more particularly forming a wall for the same.

Another object of the invention is to so construct the body portion of this trap that the front wall containing the catching means and the remaining walls may be disconnected thus making the trap, not only of the knockdown type but also permitting a front wall having larger or smaller openings and catching means to be substituted for the one already in use if desired.

Another object of the invention is to so construct this trap that the bait may not be reached by the animal endeavoring to enter the trap.

This invention is illustrated in the accompanying drawings, wherein:—

Figure 1:
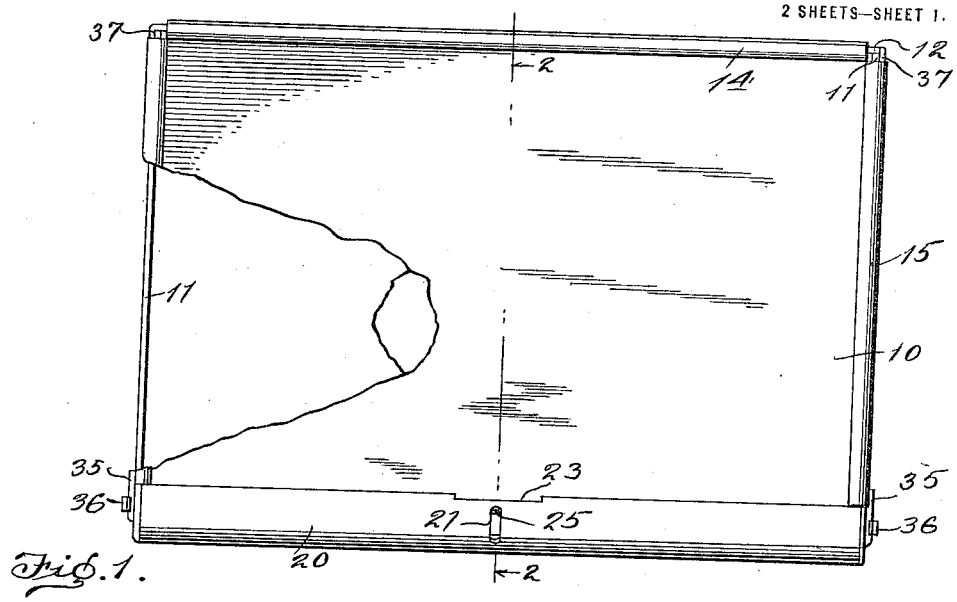
Figure 5:
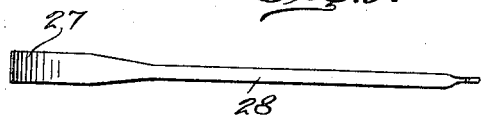
Figure 2:
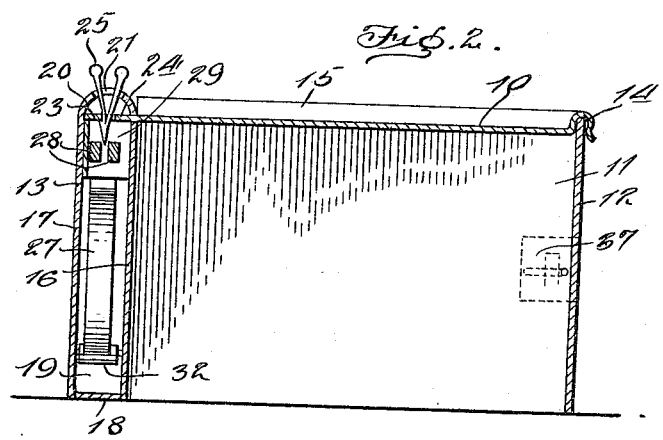

Figure 1 is a top plan view of the improved trap, one portion of the same being broken away. Fig. 2 is a vertical transverse sectional view through the trap. Fig. 3 is a view showing the improved trap in front elevation. Fig. 4 is a perspective view of the front wall of the trap before it has been closed. Fig. 5 is a top plan view of one of the catching jaws.

The trap includes a body portion having a top wall 10, side or end walls 11, a rear wall 12 and a front wall indicated in general by the numeral 13. These side walls engage the rear wall 12 and the rear wall and the side walls have their upper edge portions fitting into pockets 14 and 15 formed at the rear and side edges of the top wall 10. Therefore the rear and side walls will be removably connected with the top wall thus permitting the body portion to be taken apart and packed in a flat package when carrying the trap from one place to another in case a large number of these traps are used.

The front wall of this trap forms a housing for containing the catching mechanism and is provided with the rear or inner wall 16, outer wall 17, bottom wall 18, end wall 19, and curved upper wall 20 which merges into the inner and outer walls 16 and 17. This upper wall 20 is provided with a transversely extending slot 21 and with a longitudinally extending slot 22 through which the tongue 23 of the upper wall 10 extends, the tongue 23 being provided with an opening 24 through which a key 25 passes. This key is inserted through slot 21 into the opening 24 and when in place will releasably but securely hold the tongue within the housing or front wall. The inner and outer walls of this front wall or housing 13 are provided with alined openings 26 so that a clear passageway will be provided from the outside of the trap into the body portion. Therefore when an animal approaches the trap, it will appear as though easy access will be had to the bait which will be placed within the housing. Any suitable bait may be used, live animals being used if the animals to be caught are of the type requiring live bait. Care however, should be taken to prevent a live animal used as bait from springing the trap.

The jaws 27 are mounted within the housing 13 and have their shanks or stems 28 passing through a bracket 29 secured in the housing and extending transversely through the same. Springs 30 are connected with the shanks of the jaws 27 and with the hooks 31 carried by the end walls 19 and normally hold the jaws in the position shown at the left of Fig. 4. Triggers or catches 32 are mounted in the housing adjacent the bottom wall 18 and extend across the inlet opening 26 so that when an animal passes through the opening, the trigger will be pressed downwardly thus releasing the jaws and permitting the springs to move the same from the position shown at the right in Fig. 4 to the position shown in the left of Fig. 4. It will thus be seen that the animal will be tightly grasped and thus either held until removed from the trap or else killed outright.

When assembling this trap, the catching mechanism will first be fastened in the housing and the front wall 17 will then be bent into place and secured by the tongues 33 and 34 which also engage the side walls 11 and hold the front wall of the trap in engagement with the side walls. This is accomplished through the medium of a suitable key 35 which passes through the two walls and has its outer end portion connected with the hooks 36. The top wall will be connected with the back and side walls and the rear wall or back wall will be releasably connected with the end walls by means of the tongues and pins 37 which are similar to the tongues 33 and are shown in Fig. 1 and indicated by dotted lines in Fig. 2. The trap is now put in place and if desired may be positioned as shown in Fig. 3 adjacent the hole 38 or if desired may be turned on end and the front wall secured to the floor with one of the openings 26 positioned around the opening 38, the trap being secured in place by any suitable fasteners passing through the hole 39. After the bait has been put in place, the jaws will be moved to the extended position and releasably held in place by engagement with the triggers or catches 32. If an animal attempts to pass into the body portion through the opening 26, it will either step upon the triggers or a part of its body will strike the same thus causing the trigger to move downwardly to release the jaw and permit the jaw to move to the operative position or normal position shown in Fig. 4 at the left. The jaw will thus move to tightly grip the animal and will either hold it until removed or will kill the animal according to the portion of the animal engaged by the jaw. When no longer desired to use the trap it may be taken to pieces and either put away or shipped in a small package.

What is claimed is:—

1. A trap comprising a body portion having an upper wall and a front wall, the front wall constituting a housing having inner and outer walls provided with inlet openings permitting communication with the interior of said body portion, a tongue extending from said upper wall through an opening formed in the upper portion of the inner wall of the housing, means engaging said tongue to releasably connect the housing with the upper wall, and trapping means positioned in said housing in operative relation to the inlet openings including a trigger positioned within the housing.

2. A trap comprising a body portion including a wall constituting a housing, having inlet openings permitting communication with the interior of said body portion, a bracket in said housing, jaws having shanks slidably connected with said bracket, and having their free end portions extending across the inlet openings, resilient means engaging said shanks to yieldably hold said jaws in a closed position, and triggers mounted in said housing and extending across the inlet openings thereof, said triggers being positioned to engage the free ends of said jaws and releasably hold the same in an open position.

3. A trap comprising a body portion having a front wall constituting a housing having inner and outer walls, side walls, means releasably connecting the front wall with the side walls, a rear wall releasably connected with said side walls, an upper wall engaging the upper edge portions of said rear and side walls, a tongue extending from said upper wall through an opening formed in said inner wall of the housing, and means for releasably engaging said tongue to releasably connect the housing to the upper wall.

In testimony whereof I affix my signature in presence of two witnesses.

ADOLPH B. WIKSTROM.

Witnesses:
J. E. STRANDQUIST,
A. M. SIHLBERG.